(12) United States Patent
Gao et al.

(10) Patent No.: US 8,819,800 B2
(45) Date of Patent: Aug. 26, 2014

(54) PROTECTING USER INFORMATION

(75) Inventors: Zhi Guo Gao, Beijing (CN); He Yuan Huang, Beijing (CN); Li Li, Beijing (CN); Rui Xiong Tian, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 282 days.

(21) Appl. No.: 12/846,894

(22) Filed: Jul. 30, 2010

(65) Prior Publication Data

US 2011/0030047 A1 Feb. 3, 2011

(30) Foreign Application Priority Data

Jul. 31, 2009 (CN) .......................... 2009 1 0165462

(51) Int. Cl.
*H04L 29/06* (2006.01)
(52) U.S. Cl.
USPC .................................................. 726/9
(58) Field of Classification Search
USPC ...................... 726/17, 18, 19, 20, 9
See application file for complete search history.

(56) References Cited

U.S. PATENT DOCUMENTS

| | | | |
|---|---|---|---|
| 7,512,784 B2 | 3/2009 | Skemer | |
| 2003/0005118 A1* | 1/2003 | Williams | 709/225 |
| 2003/0050081 A1 | 3/2003 | Huber | |
| 2003/0074456 A1* | 4/2003 | Yeung et al. | 709/229 |
| 2005/0010780 A1* | 1/2005 | Kane et al. | 713/182 |
| 2006/0026042 A1* | 2/2006 | Awaraji et al. | 705/3 |
| 2007/0067385 A1 | 3/2007 | D'Angelo et al. | |
| 2007/0289002 A1* | 12/2007 | van der Horst et al. | 726/9 |

FOREIGN PATENT DOCUMENTS

| | | |
|---|---|---|
| CN | 1547142 A | 11/2004 |
| CN | 101136915 A | 3/2008 |
| CN | 101431654 A | 5/2009 |
| EP | 1764972 A1 | 3/2007 |
| EP | 1868131 A1 | 12/2007 |
| WO | WO 03/007102 A2 | 1/2003 |
| WO | WO 2007/118239 A2 | 10/2007 |

OTHER PUBLICATIONS

Manzur,—http://ieeexplore.ieee.org/Xplore/login.jsp?url=http%3A%2F%2Fieeexplore.ieee.org%2Fiel5%2F4351441%2F4351442%2F04351461.pdf%Farnumber%3D4351461&Decision=-203.
"A Conceptual Framework for A Sim-Based Electronic Transaction Authentication System".
www.projectliberty.org/liberty/content/download/397/2750/file/SIM_Strong_Authentcation_Whitepaper.pdf.
Schuba, et al., "Internet ID—Flexible Re-use of Mobile Phone Authentication Security for Service Access".
http://www.ericsson.com/technology/research_papers/service_layer/doc/internet_id_nordsec.pdf.

(Continued)

*Primary Examiner* — Michael S McNally
(74) *Attorney, Agent, or Firm* — Cantor Colburn LLP (57) ABSTRACT

A method and apparatus for protecting user information. The method includes receiving a request for accessing the user information from an application. When the request does not include an authorized token, the user is requested to temporally confirm the request for access. In response to the confirmation, a token is generated and the user on a mobile service platform is associated with the request for access by the token. The application is then allowed to access the user information based on the token associating the user with the request for accessing the user information from the application.

17 Claims, 4 Drawing Sheets

(56) References Cited

OTHER PUBLICATIONS

Audun Wangensteen, et al., http://lundeweb.com/pdf/ICISP06.pdf—"A Generic Authentication System Based on SIM".

Nguyen, Third Party Gateway Plug-in . . . Server, Dec. 2001, http://download.boulder.ibm.com/ibmdl/pub/software/cn/websphere/products/download/whitepapers/ThirdPartyGW-Plugin.pdf.

* cited by examiner

PROTECTING USER INFORMATION

This application claims priority under 35 U.S.C. 119 from Chinese Patent Application 200910165462.8, filed Jul. 31, 2009, the entire contents of which are incorporated herein by reference.

BACKGROUND OF THE INVENTION

1. Field of the Invention

The present invention generally relates to communications, and particularly relates to a method and apparatus for protecting user information.

2. Description of Related Art

The number of mobile terminals connected into a mobile internet is increasing. More and more applications are being deployed on the mobile internet. Currently, many mobile operators are actively deploying related platforms in order to fully utilize the mobile internet to obtain more business values.

Some mobile operators proposed a Value-added services general operation platform (VGOP). VGOP is a platform which uniformly develops, manages, operates and analyzes value-added services. The development and deployment of VGOP thereof make the mobile operators recognize that the importance of standardized management of value-added services increases significantly during the course of transition from a communication service provider to a content service provider.

Generally, VGOP is composed of five functional portions: the first is sale; the second is analysis; the third is interconnection and sharing; the fourth is operating management and monitoring; and the fifth is portal. The VGOP platform manages the above functions in an integrated manner, while enables uniform services and operations to the external.

In the VGOP platform or other similar platforms, a large amount of user-related information will be maintained and managed, which may be utilized by applications developed by the third-party companies. As these data are opened to the third-party applications, identity authentication and authorization is one of the important aspects. However, the third-party applications running on the platform are of huge number and various types. It is difficult for the mobile operators to establish trust relationships with each of the third-party applications one by one. Further, if there are no trust relationships between the third-party applications and the mobile service platform, it is difficult to ensure the security of the related user information in the platform.

Currently, if the mobile terminal accesses the third-party application and the third-party application needs to access mobile information platform to fulfill a service, there are generally two access flows. One is the mobile terminal accesses the third-party application directly, and then while the third-party application accesses the mobile service platform, if it is required for identity authentication/authorization, the third-party application will require the mobile terminal to tell account and password of this mobile terminal user in the mobile platform, and then the third-party application directly accesses the mobile service platform on behalf of the mobile user. In such a flow, the user account and password of the mobile terminal user in the mobile service platform will be leaked to the third-party application.

Figure 1:
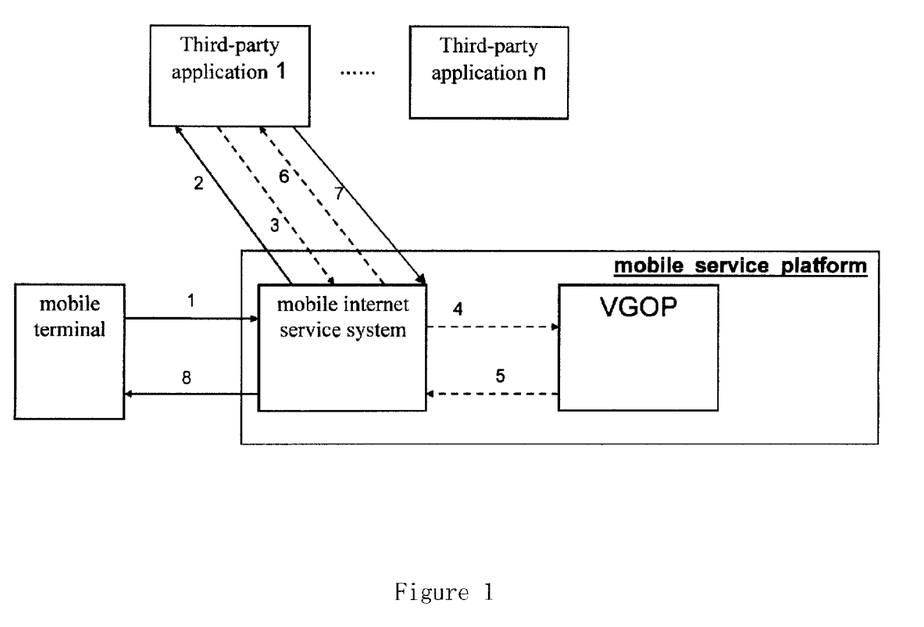
FIG. 1 is a schematic diagram of an existing framework that a mobile terminal accesses the third-party application through the mobile service platform.

FIG. 1 shows the other flow: the mobile terminal accesses the mobile service platform, and passes the identity authentication and gets authorization of the mobile service platform. The subsequent accesses are accessing the third-party application via the mobile service platform. If the third-party application needs data in the mobile service platform, the third-party application can obtain the data in the mobile service platform directly. In this flow, there is a trust relationship between the third-party application and the mobile service platform, which is generally established by signing a contract. The detailed steps are as follows:

1) the mobile terminal issues an HTTP request to the mobile service platform, the HTTP request brings information that the third-party application needs for access;
2) the mobile service platform forwards the access request to the third-party application;
3) the third-party application needs to access the data in the mobile service platform, and transmits an HTTP request for data access or value-added service access to the mobile service platform;
4) if the mobile service platform needs to access a value-added service platform (for example, VGOP), it transmits a request for value-added service access to the value-added service platform;
5) the value-added service platform returns a response to the value-added service access;
6) the mobile service platform returns a response to the data access or the value-added service access to the third-party application;
7) the third-party application returns a response to the access of the mobile terminal to the mobile service platform; and
8) the mobile service platform returns the result of the access by the mobile terminal.

However, as mentioned above, since the third-party applications on the VGOP platform are very rich, the mobile operators can not establish trust relationships with the providers of the third-party applications one by one. Therefore, the above-described existing access flow can not meet the requirement of new platform that can host large amount of various third-party applications.

Patent application WO 03/007102A (Modular Authentication and Authorization Scheme for Internet Protocol) proposed a system for three-party authentication and authorization. In the system, there is an authorizer especially responsible for authorizing user requests, and a service provider party makes response to the user requests according to the authorization result from the authorizer. This patent document requires the service provider to fully trust the authorization result from the authorizer, and the service party will not perform identity authentication/authorization by itself. This method needs a third-party, such as a mobile operator, which is trusted by both the user and the service provider.

SUMMARY OF THE INVENTION

In accordance with one aspect of the present invention a method for protecting user information includes the steps of: receiving a first request for accessing the user information from an application; generating and transmitting a first token to the application if the first request does not include an authorized token; associating the first token with the first request; receiving an authentication request from the user, the authentication request including the first token obtained from the application by the user; authenticating the user in response to receiving the authentication request; requesting the user to confirm the first request; generating a second token in response to the user's confirmation of the first request; transmitting the second token to the user; associating the second token with the user; receiving a second request for accessing the user information from the application, the second request including the second token obtained from the user by the application; and allowing the application to access the user information in response to receiving the second request.

In accordance with another aspect of the present invention, apparatus for protecting user information includes: means for receiving a first request for accessing the user information from an application; means for generating and transmitting a first token to the application, and associating the first token with the first request, if the first request does not include an authorized token; means for authenticating the user in response to receiving an authentication request from the user, the authentication request including the first token obtained from the application by the user; means responsive to authentication of the user for requesting the user to confirm the first request according to the association of the first token with the first request; means responsive to the user confirming the first request for generating a second token, transmitting the second token to the user, and associating the second token with the user; means for receiving a second request for accessing the user information from the application, the second request including the second token obtained from the user by the application; and means for allowing the application to access the user information according to the association of the second token with the user, in response to receiving said second request.

In a further aspect of the present invention, the system for protecting user information includes a mobile service platform that includes a user information storage module for storing the user information and a service method function module for accessing the user information according to an instruction of the apparatus for protecting user information.

BRIEF DESCRIPTION OF THE DRAWINGS

Detailed descriptions of features and advantages of embodiments of the present invention are given by referring to the following figures. Same or similar components in different figures and the descriptions are denoted with same or similar reference number, if possible. In the drawings.

DETAILED DESCRIPTION OF THE PREFERRED EMBODIMENTS

With the method and the apparatus for protecting user information provided by the present invention may prevent personal information from being leaked among different platforms. The present invention also may prevent the third-party application from knowing the relationship between a user name in the mobile service platform and user information in the mobile service platform, thus effectively protecting user information.

Detailed descriptions of illustrative embodiments are provided below. Examples of the embodiments are illustrated in accompany figures, wherein same reference numbers always denote same components. It should be understood that, the present invention is not limited to the disclosed illustrative embodiments. It also should be understood that, not each feature of a method and apparatus illustrated herein is necessary for practicing the present invention claimed in any claim. Further more, in the whole disclosure, when a process or method is shown or described, steps of the method can be performed in any sequence or be executed simultaneously, unless it is clear from the context that one step depends on the proceeding execution of another step. Further, there can be significant time interval between steps.

Figure 2:
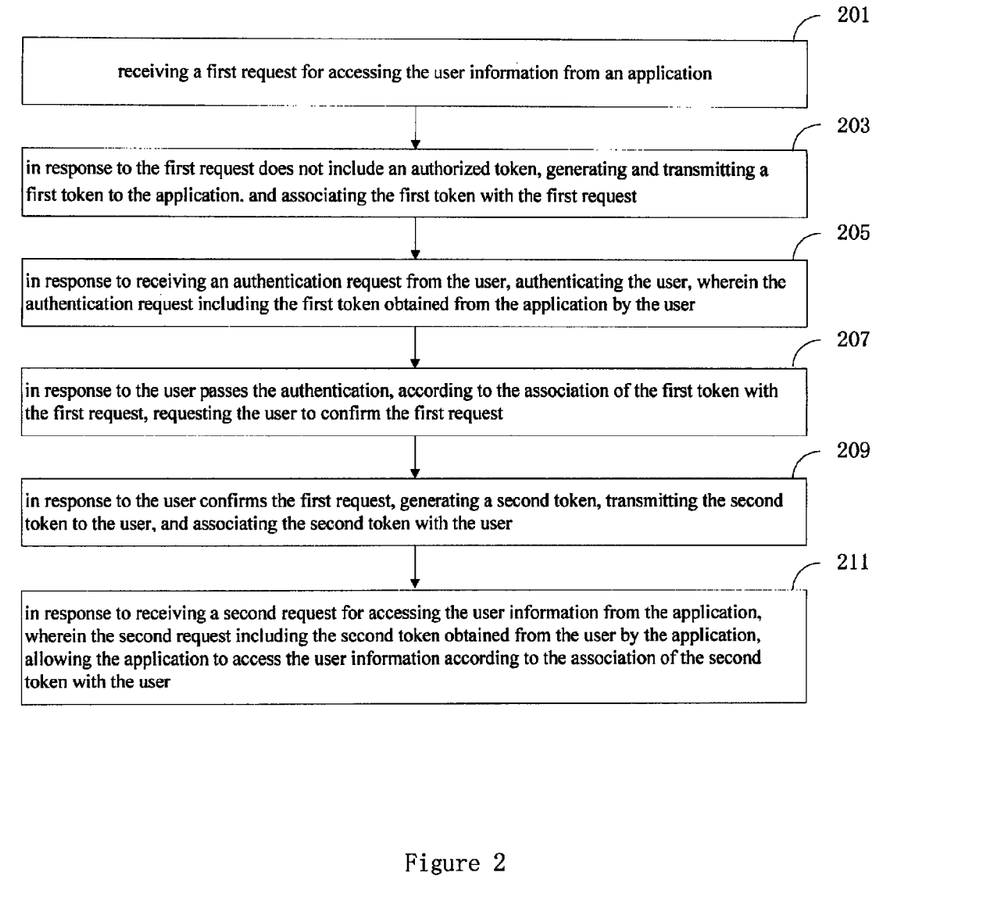
FIG. 2 is a flowchart of a first embodiment of the method for protecting the user information of the present invention.

The first embodiment of the method for protecting the user information of the present is described in detail thereafter by referring to FIG. 2.

Referring to FIG. 2, in step 201, firstly, a first request for accessing user information is received from an application. The first request can be issued by a third-party application to a mobile service platform in HTTP request according to a service request of a user; this request includes information of a user in the mobile service platform for access. The third-party application can make a related request through a service method (an application interface) provided by the mobile service platform. The mobile service platform will provide service methods, such as GetFriendsList<token><parameter 2><parameter 3>< . . . >, SendMsgToFriends<token> <parameter 2><parameter 3>< . . . >, to be called by the third-party application. Other parameters than the token parameter can be added based on requirement of an application, for example the content to be sent (short message, multimedia message), etc., and since the detailed contents of other parameters depends on the particular applications, detailed description thereof are omitted herein. The first request can be in the manner of GetFriendsList<NULL> or SendMsgToFriends<NULL>, and in the viewpoint of the mobile service platform, the first request is not confirmed by a user on the mobile service platform, because it brings no authorized tokens from users.

In step 203, in response to the first request does not include an authorized token, a first token is generated and transmitted to the application, and the first token is associated with the first request in the mobile service platform. In this step, the mobile service platform generates the first token in response to the first request from the third-party application. This token can be a random number. The first token is associated with the first request. The first token can be associated with a service method, an application service address and like included in the first request. The application service address refers to an address of a service provided by the third-party application, such as an address of information for recommending popular movies. The way for associating can adopt a list or any other suitable data structure. The generated first token will be sent to the third-party application. A manner of making response to the HTTP request can be adopted to send the first token to the third-party application by the mobile service platform; of course manners in correspondence with other protocols corresponding to the first request can be adopted for making response.

In step 205, in response to receiving an authentication request from the user, authenticating is performed on the user, wherein the authentication request includes the first token obtained from the application by the user. The third-party application obtains a response from the mobile service platform based on an existing request/response scheme, and the user obtains the first token from the third-party application. Preferably, the third-party application forwards the first token to the user. The process of forwarding can use the redirect technique for HTTP request.

The redirect operation of HTTP can be implemented automatically by a browser of a client terminal. The browser, after receiving the HTTP response, operates according to a status code of an HTTP response and a Header field in the response, and accesses a Uniform Resource Locator (URL) given in a Location Header. Therefore, the third-party application adds the Location Header in the response sent to the mobile terminal, and the mobile terminal, after receiving the HTTP response, will access automatically a page pointed to by the Location Header. If the user terminal obtains a response including the first token from the third-party application, the user terminal will request the mobile service platform to perform user identity authentication, and this request will include the first token. Also, this request can be made in the manner of HTTP request or made by use of an agreed specific protocol, and all related requests and responses thereafter can be made in such a manner of HTTP, detailed descriptions of them are omitted herein.

The user requests the mobile service platform for user identity authentication requested by the user terminal, wherein the user can use various existing authentication methods, such as User Log-in. Preferably, when the user terminal is a mobile telephone, the mobile service platform may authenticate the user by use of an IMSI (International Mobile Subscriber Identity) of the mobile telephone of the user. The mobile service platform will have registered the IMSI number of a mobile telephone when the mobile telephone connects to the network, so by this way, the troubles of having to enter user name and password when the user logs in are greatly alleviated, and in the view point of the user, this type of process is performed automatically wholly without any manual intervening, so that a seamless authentication with zero burden is realized and the user's experience is enhanced greatly.

In step 207, in response to the user passing the authentication, according to the association of the first token with the first request, the user is requested to confirm the first request. After confirming the user identity, the mobile service platform firstly checks whether the first token is included in the request of the user or not, and then according to the previous established association of the first token with the application, the user information to be accessed by the user, generates related message, for example, the message can be "an application xxx requests to access your friends numbers temporarily, do you agree?", and send this message to the user, so as to request a confirmation from the user.

In step 209, in response to the user confirming the first request for allowing the application to access the user information, a second token is generated and transmitted, and the second token is associated with the user. The mobile service platform receives the user's confirmation of allowing the third-party application to temporarily access his friends' numbers, and the mobile service platform will generate a second token, wherein the second token can be a random number and is different from the first token. After the second token is generated, the first token can be revoked. At the same time, the second token is associated with the user. Preferably the second token is further associated with the first request, and the second token can be associated with an application service address and a service method included in the first request. The mobile service platform will transmit the second token after generating it.

In step 211, in response to receiving a second request for accessing the user information from the application, wherein the second request includes the second token forwarded to the application by the user, the application is allowed to access the user information according to the association of the second token with the user. The mobile service platform can transmit the second token to the user using a manner of re-direct in step 209, and the user may forward the second token to the third-party application after receiving the second token or the third-party application can ask for the second token.

Based on the second token, the third-party application may make a second request for accessing the user information to the mobile service platform using a service method provided in the mobile platform, the second request including the second token and indicating its access has been confirmed by the user. In response to the second request, the mobile service platform checks the second token and allows the application to access the user information temporally. Preferably, the second token further can be revoked when the access ends. In the whole course, the third-party application can not obtain the user name of the user on the mobile service platform, so that it can not obtain the corresponding relationship between the user name and the user information of an individual on the mobile service platform, that is, what the third-party application obtains is only some messy data. Thus, the information of a user on the mobile service platform is protected.

Figure 3:
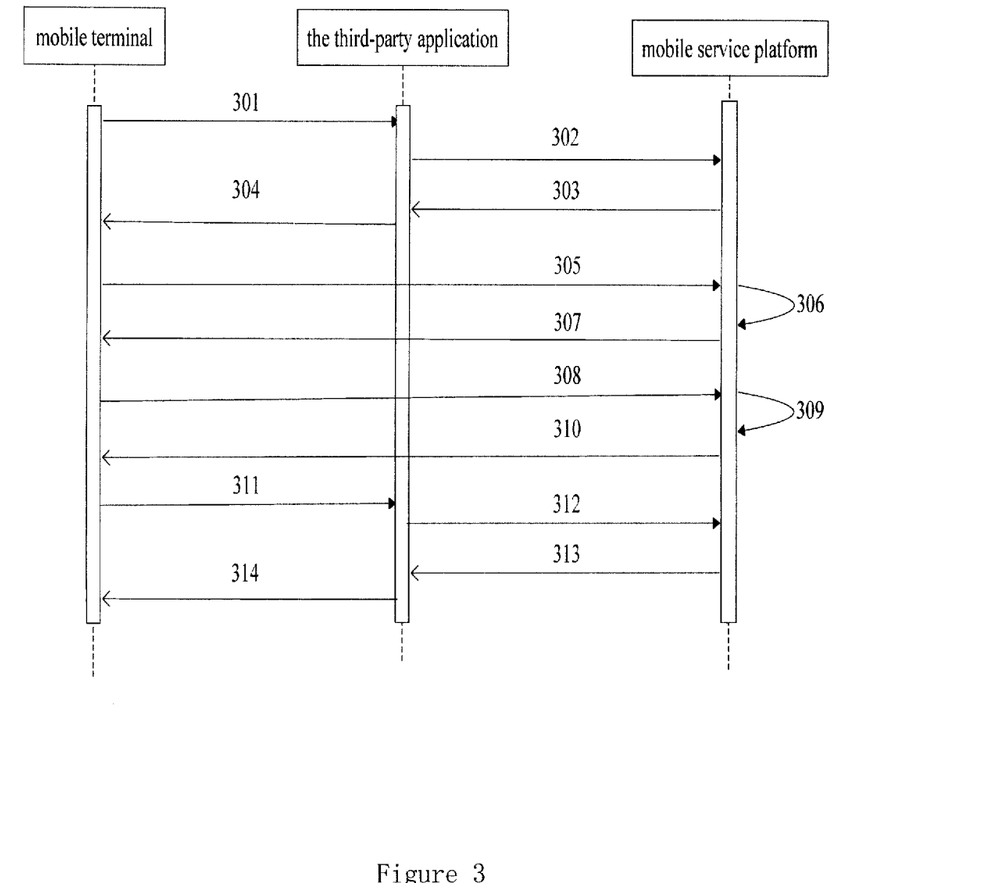
FIG. 3 is a flowchart of a second embodiment of the method for protecting the user information of the present invention.

Referring to FIG. 3, detailed descriptions are given of a second embodiment of the present invention by and in conjunction with concrete application examples. It is assumed that a user accesses a third-party application, and the third-party application relates to a current popular movie. When the user watches some interesting information, he/she wishes to send it to his/her friends in a manner of short message, and his/her own friends list is maintained on the mobile service platform. It is assumed that the address of the third-party application is http://www.xyzmovie.com and the address of the mobile service platform is http://www.abcdmobile.com. A page (address) sent to the friends by the third-party application in the message is http://www.xyzxyzmovie.com/Recommend page, and a service method opened to the third-party application by the mobile service platform for sending the message to the friends is SendMsgToFriends<token><...>.

FIG. 3 shows a detailed flow of the whole system and, although the present invention describes the flow of the whole system in details starting from the user terminal, it does not mean that the protection scope of any one of claims in the present invention must include the user terminal, the third-party application and the mobile service platform or the corresponding steps executed thereon.

As indicated by arrow 301, a user transmits a service request to a third-party application from a user terminal through user terminal tools such as a browser, after the user has passed related authentication of the third-party application (depending on the third-party application or the user, the authentication processing is optional), for example, the user may transmit a request for recommending a page to his/her own friends to the third-party application via the browser, wherein the detailed HTTP request can be URL=http://www.xyzxyzmovie.com/Recommend.

Arrow 302 indicates that after the third-party application receives the request from the user, the third-party application transmits an access request to the mobile service platform using the service method provided by the mobile service platform, wherein the detailed HTTP request can be URL=http://www.abcdmobile.com/SendMsgToFriends?callback=http://www.xyzxyzmovie.com/Recommend (this request does not have tokens). The request indicates that, because the third-party application needs to access the user information of the user in the mobile service platform, such as a friends list, a first token is requested, and the mobile service platform is informed of an application service address of the third-party application and the service method provided by the mobile service platform requested. The mobile service platform receives an HTTP request without any token parameter from the third-party application, which means the request has not been confirmed or authorized by the user in the viewpoint of the mobile service platform, therefore the mobile service platform will initiate a process for requesting the user for confirmation.

Arrow 303 indicates that the mobile service platform will generate a first token, for example, the first token can be a random number, and the mobile service platform will associate the first token with the access request from the third-party application, such as establishing a triplet group similar to <token, service method, service address of the third-party application> or a quadruple group similar to <the first token, the second token, service method, service address of the third-party application>, wherein the second token is Null at this time. Of course, any other suitable data structure can be used to identify the association between the token and the request for accessing the user information from the third-party application, such as list and the like. The mobile service platform returns an HTTP response to the third-party application: Status code=3xx, Location: http://www.abcdmobile.com/logon?token=token1, wherein 3xx is a status code for instructing the browser side how to perform re-directing. By the above response to the third-party application, the mobile service platform sends the first token to the third-party application.

Arrow 304 indicates that the third-party application generates an HTTP re-direction response, Status code=3xx, Location: http://www.abcdmobile.com/logon?token=token1, to be returned to the user according to HTTP response returned to the third-party application from the mobile service platform, and returns an access token token1 to the user. The re-direction response is only one choice, and another choice can be that a corresponding accessible address is sent to the user and the user can decide whether to access the mobile service platform on his/her own.

Then, as indicated by arrow 305, the user makes an authentication request, for example an HTTP request URL=http://www.abcdmobile.com/logon?token=token1, to the mobile service platform via the user terminal. If the user terminal is a mobile telephone, it is preferable to install a plug-in in the browser. The plug-in reads an IMSI code of the mobile telephone, intercepts the re-directional message and adds the IMSI code to the corresponding HTTP request, accordingly the HTTP request can be URL=http://www.abcdmobile.com/logon?token=token1&imsi=xxxx for subsequent authentication. No inventive labors are required for those skilled in the art to realize a plug-in for reading the IMSI code of a mobile telephone by programming.

In the step indicated by arrow 306, the mobile service platform will perform identity authentication on the user. If the user terminal is a mobile telephone, it is preferable to directly authenticate through the IMSI code of the mobile telephone by using the method described above, or a direct authentication can also be performed in the case that other mobile terminals have corresponding hardware unique identifiers, and of course it can be performed through other methods such as user log in. At the same time, the mobile service platform checks whether the authentication request has the first token, and checks against the triplet groups <token, service method, service address of the third-party application> maintained on the mobile service platform. If there is a triplet group corresponding to the token, then the mobile service platform according to the triplet group generates a message for requesting the user to confirm that the third-party application accesses the user information, for example, generates a message for requesting the user to confirm whether to allow the third-party application to access a friends list of the user.

In the step indicated by arrow 307, the mobile service platform transmits an HTTP request, Status code=200, HTTP Entity Content Body="third-party application http://www.xyzxyzmovie.com wishes to send a recommend message to your friends list, do you want to authorize the access?" to the user for requesting the user to confirm that third-party application accesses the user information. Return address is: http://www.abcdmobile.com/authentication, and Status code=200 represents a response of authentication request succeeding.

If the user responds to the mobile service platform with respect to the confirmation request as shown by arrow 308 and confirms that the third-party application is allowed to temporally use the user information kept on the mobile service platform by the user URL=http://www.abcdmobile.com/authentication?option=yyyyy, the mobile service platform generates a second token as shown by arrow 309 in response to the authorization confirmation by the user, wherein the second token is a random number and the second token is different from the first token. Here, the mobile service platform associates the first token with the user name on the mobile service platform of the user through the first token and the authentication of the user. A user name can be represented by a user identifier. The user identifier is a unique identifier indicating the user identity of the user on the mobile service platform, and it can be a mobile telephone number of the user, an IMSI code of the mobile telephone or any other unique identifiers assigned to the user by the mobile service platform. Thus, the above triplet group <token, service method, service address of the third-party application> can be replaced with a quadruple group <token, service method, service address of the third-party application, user identifier>. The user identifier can be recorded during the course of requesting authentication by the user and is not limited to being recorded only after the user passes the authentication. The first token can be revoked selectively, for example, using the second token to overwrite the original first token in the quadruple group <token, service method, service address of the third-party application, user identifier>. Further, a quintuplet group <the first token, the second token, service method, service address of the third-party application, user identifier> can be used to fill the location of the second token with a generated second token.

Arrow 310 indicates that the mobile service platform transmits a response including the service address of the third-party application and the second token to the user, and this response is re-directed by the browser at arrow 312. The detailed HTTP response is, for example, Status code=3xx, Location: http://www.xyzxyzmovie.com/Recommend?token=token2. The mobile terminal of the user will receive this response, and then terminal tools such as a browser on the user terminal performs the re-directional operation to transmit the second token to the third-party application: URL=http://www.xyzxyzmovie.com/Recommend?token=token2.

As shown by arrow 312, in response to receiving the above HTTP request having the second token and requested service forwarded by the user, the third-party application sends, by using service methods (application interfaces), a second request, such as URL=http://www.abcdmobile.com/SendMsgToFriends?token=token2&callback=http://www.movie.com/Recommend, to the mobile service platform according to the second token and the application service request.

When the mobile service platform receives the second request from the third-party application, the mobile service platform parses the second request according to the above request of the third-party application so as to obtain the second token token2, and compares it with the recorded quadruple groups <token, service method, service address of the third-party application, user identifier> or quintuplet groups <the first token, the second token, service method, service address of the third-party application, user identifier>, if a quadruple group or quintuplet group corresponding to the second token exists, the third-party application can be allowed to access the method provided by the mobile service platform and the user information, and to perform related operations of the service method, such as to transmit popular movies information to friends of the user identified by the user identifier.

Preferably, a further check can be performed so that only if a service method called by the first request kept in the quadruple group or quintuplet group is consistent with a service method called by the second request or only if a application service address included in the first request is consistent with a application service address included in the second request, the third-party application is temporally allowed to access the method(s) provided by the mobile service platform and the user information and to perform related operations of the service method according to the information recorded by the quadruple group or quintuplet group.

If, in comparing, no quadruple group or quintuplet group corresponding to the shown second token exists or the quadruple group or quintuplet group corresponding to the second token exists but the service method called by the first request is inconsistent with the service method called by the second request, the access of the third-party application is rejected. Arrow 313 indicates that related execution information is returned to the third-party application, for example, an HTTP response is transmitted to the third-party application: Status code=200, Body="transmitting a message to friends succeeds". At arrow 314, the third-party application forwards HTTP information to the user: Status code=200, Body="transmitting a message to friends succeeds".

Preferably, the mobile service platform can delete the data information related to the token, such as the quadruple group or quintuplet group and like, after the authorized access of the third-party application of this time ends or the operations of the service method complete, so as to prevent the third-party application from still using the information of the user on the mobile service platform before being authenticated by the user in future.

The flow of user identity authentication and authorization needed when the third-party application is to access the user data in the mobile service platform is described above. The flow is completed actually through operations of the HTTP request/response among the mobile terminal, the third-party application and the mobile platform, and of course it also can be completed based on other special protocol. The HTTP request/response is exemplary, only for the purpose of assisting those skilled in the art to understand the present invention, and should not be constructed as a limitation of the protection scope of the present invention.

With the method illustrated in the second embodiment of the present invention, it can be ensured that the third-party application can access related service methods provided by the mobile service platform without knowing the user identifier of the user on the mobile service platform, further, even if the third-party application accesses such a method as GetFriendsList<Token> provided by the mobile service platform, it can only obtain some pieces of information fragments of the user. During this course, the user's authorization is just temporary for some applications and one call from a application, the user information can not be used by the third-party application for other use not wanted by the user, and the requirement of the mobile service platform for enlarging the application services of the platform is also satisfied. Furthermore, the user terminal is not limited to a mobile terminal, and any user terminal that can access the third-party application or the mobile service platform can apply to the present invention. The third-party application can be deployed on the mobile service platform, or maintains its own separate server or be deployed on other mobile service platforms.

Preferably, sometimes a user might consider it is more advantageous to let some applications access the information kept in the mobile service platform by himself in a time period specified by him. Thus, by referring to the second embodiment, it is considered such a scenario: after a user recommended a message about a popular movie A to friends, he browses web pages and finds some messages about a popular movie B, and he also wishes to recommend them to his friends. For this mobile user, he will call http://www.xyzxyzmovie.com/recommend twice.

During this course, a session association is needed to be implemented between the user and the third-party application, and further the third-party application needs to store an association relationship between the session identifier sessionID and token2. Operations for session are prescribed by HTTP protocol, therefore the user needs not consider it, and the browser and a web server of the third-party application will decide whether one HTTP request belongs to an existing session or it is needed to startup a new session through a manner of automatically setting sessionID=xxxxxx in a cookie. For the third-party application, among the fourteen steps in the second embodiment, the step of arrow 304 and the step of arrow 311 can be changed slightly. In the step of arrow 304, a header of set-cookie can be added to the HTTP response transmitted to the user from the third-party application, and the value of the header is: sessionID=abcabc.

In the step of arrow 311, the browser holds a Cookie header in a Cookie kept by the user terminal, and its value is: sessionID=abcabc. When the server of the third-party application receives a message of the step of arrow 311, it will find both sessionID=abcabc and token=token2 are included in the request, and the third-party application may keep the association relationship such as <SessionID, Token2>, wherein the Token2 is the second token. However, for the mobile service platform, when it requests the user to confirm of allowing the third-party application to access the user information, at the same time it inquires the user whether the confirmation of allowing the third-party application to access the user information is one time or has a period of validity (such as one week, one day or half of a day, or being valid one time, etc.).

Requesting the user to confirm the period of validity can be implemented by transmitting a request to the user separately. If the user confirms that its authorization has a certain period of validity, the mobile service platform adds a record about the period of validity to the stored quadruple group or quintuplet group, for example, by amending the quadruple group as <token, token period of validity, service method, service address of the third-party application, user identifier> correspondingly. Each time the execution of the service method ends, the mobile service platform will check the period of validity of the token in order to decide whether to revoke the token, or the mobile service platform checks whether the token is within the period of validity when the third-party application make a request.

After the user recommended the message about movie A to his friends, if the user further wishes to recommend some messages about movie B to the friends, then at this time, this user may transmit an HTTP request to the third-party application: URL=http://www.xyzxyzmovie.com/Recommend?

token=token2, corresponding to the steps shown as arrows 11, 12, 13 and 14 of the second embodiment, wherein the Cookie Header is set to sessionID=abcabc. When the server of the third-party application receives this HTTP request, it queries the second token corresponding to the sessionID and finds out token=token2 according to the association relationship <SessionID, Token2) recorded previously.

Then, the third-party application makes a request to the mobile service platform: URL=http://www.mobile.com/SendMsgToFriends?token=token2&callback=http://www.movie.com/Recommend?name=movieB. In response to receiving the above request from the third-party application, the mobile service platform checks whether such a valid second token exists, and if such a valid second token and a corresponding quadruple group or quintuplet group exist, the mobile service platform allows the third-party application to call the related service methods it provides. If not, a first token can be generated and the identity authentication and authorization process as the first embodiment or the second embodiment is initiated. By utilizing the way of period of validity of token, an excellent balance and active effect can be obtained between protecting the user information and providing good user experiences.

Figure 4:
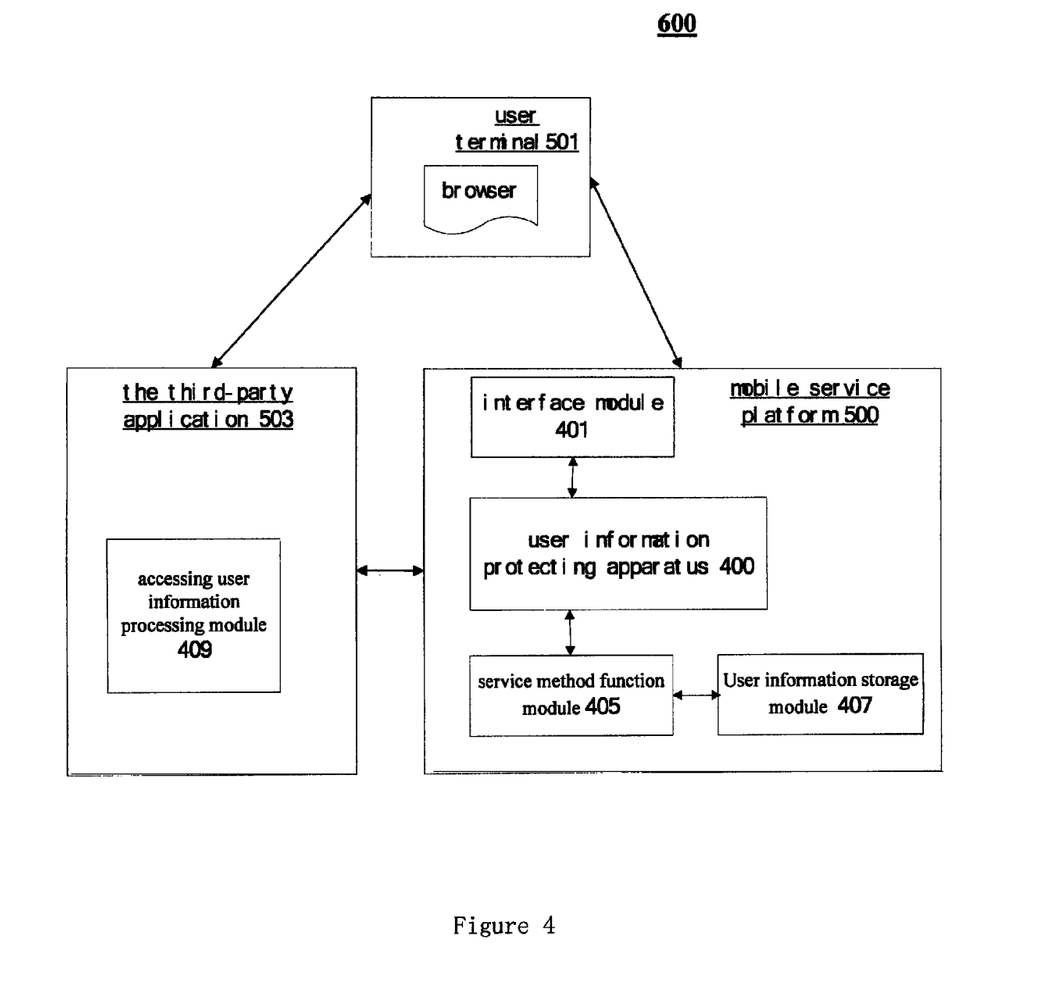
FIG. 4 shows a system for protecting the user information of the present invention.

The third embodiment of the present invention provides an apparatus 400 for protecting user information. As shown in FIG. 4, a mobile service platform 500 includes an interface module 401. Communications between users and the apparatus 400 for protecting user information and between the protection user information 400 and application can be both performed via the interface module 401. The interface module 401 can be used to receive, directly or indirectly, related requests and responses thereof from the user or application, and to transmit related responses or requests to the user or the third-party application. The mobile service platform 500 further includes a service method function module 405 for accessing related user information and providing corresponding services in response to a confirmed service request from the third-party application, for example, for transmitting related contents provided by the third-party application to friends of the user. The apparatus 400 for protecting user information is deployed on the mobile service platform, and can instruct the service method function module 405 of the mobile service platform 500 to access a user information storage device 407 in order to obtain the user information stored on the mobile information service platform, and transmit the user information to the application or perform operations of the service method by use of the user information.

The apparatus 400 for protecting user information includes: means for receiving a first request for accessing the user information from an application; means for generating and transmitting a first token to the application, and associating the first token with the first request, in response to the first request does not include an authorized token; means for authenticating the user in response to receiving an authentication request from the user, wherein the authentication request including the first token obtained from the application by the user; a means for requesting the user to confirm the first request according to the association of the first token with the first request, in response to the user passes the authentication; means for generating a second token, transmitting the second token to the user, and associating the second token with the user, in response to the user confirms the first request; means for allowing the application to access the user information according to the association of the second token with the user, in response to receiving a second request for accessing the user information from the application, wherein the second request including the second token obtained from the user by the application. Associating the first token with the first request includes associating the first token with an application service address and a service method included in the first request, or associating the second token with the user includes associating the second token with a user identifier. Allowing the application to access the user information according to the association of the second token with the user further includes: comparing the application service addresses and service methods included in the first request and the second request; allowing the application to access the user information, in response to the application service addresses and service methods included in the first request and the second request are the same. The apparatus for protecting user information further includes: means for revoking the second token, in response to finishing accessing the user information by the application. The apparatus for protecting user information further including: means for receiving a period of validity of the second token confirmed by the user; and means for allowing the application to access the user information for a plurality of times during the period of validity of the second token. The means for generating a second token, transmitting the second token to the user, and associating the second token with the user, in response to the user confirms the first request further includes: means for associating the second token with an application service address and a service method included in the first request. The apparatus for protecting user information further includes: means for authenticating the user by use of an International Mobile Subscriber Identity IMSI of the mobile telephone of the user.

The detailed control method of the apparatus 400 for protecting user information is the same as the above embodiments, which are omitted herein.

The fourth embodiment of the present invention provides a system 600 for protecting user information. The system 600 for protecting user information includes a mobile service platform 500, a user terminal 501 and a third-party application 503. The third-party application 503 can be deployed on the mobile service platform 500, or be deployed on a server of a third-party or other party. The user terminal 501 has tools for interacting with the mobile service platform 500 and the third-party application 503, such as a browser. The user may control the user information kept on the mobile service platform by him or her through the user terminal 501.

The mobile service platform 500 includes a apparatus 400 for protecting user information, a service method function module 405 and a user information storage apparatus 407. Using the service method function module 405 and the user information storage apparatus 407, the user information or operations for completing the service method can be provided to the related third-party application which is authorized temporally. The third-party application 503 includes an accessing user information processing module 409, which may temporally access the user information by combining the related authorized token obtained with the service method, as an application interface, of the mobile service platform, and may combine the user information obtained temporally to provide the user with corresponding various service. What obtained by the third-party application is only some pieces of the user information that can not associated with the user on the mobile service platform, so that the system effectively protects private information of the user. The detailed control method of the system is the same as the above embodiments, which are omitted herein.

Further, the method for protecting user information according to the present invention also can be implemented with a computer program product. The computer program product includes software code section which is executed, when run on a computer, to implement the emulation method of the present invention.

The present invention can also be implemented by recording a computer program in a computer readable recording medium. The computer program includes software code section which is executed, when run on a computer, to implement the emulation method of the present invention. That is, the procedure of the emulation method of the present invention can be distributed in the form of instructions in a computer readable medium or other various forms, regardless of what specific types of the signal carrying medium for implementing the distribution actually are. Examples of a computer readable medium includes mediums such as EPROM, ROM, tape, paper, soft disk, hard drive, RAM and CD-ROM, and medium of transmission type such as digital or analog communication link.

Although the present invention has been shown and described with reference to preferred embodiments of the present invention, those skilled in the art will understand that various changes and modifications in form and details can be made to the embodiments without departing the principles and spirit of the present invention and they still fall into the scope of claims and the equivalent thereof.

What is claimed is:

1. A method for protecting user information in a communication system, the method comprising the steps of:
    receiving, from an application, a first request to access the user information;
    determining that the first request does not include an authorized token;
    responsive to the determination that the first request does not include an authorized token, generating and transmitting a first token to the application;
    associating the first token with the first request;
    receiving, from the user, an authentication request that includes the first token obtained from the application by the user;
    authenticating the user in response to receiving the authentication request;
    requesting the user to confirm the first request;
    generating a second token in response to a user-initiated confirmation of the first request;
    transmitting the second token to the user;
    associating the second token with the user, wherein the second token is also associated with a user identifier;
    receiving a second request for accessing the user information from the application, the second request including the second token obtained from the user by the application; and
    allowing the application to access the user information in response to receiving the second request.

2. The method as claimed in claim 1, wherein the step of associating the first token with the first request includes associating the first token with an application service address and a service method included in the first request.

3. The method as claimed in claim 2, further comprising:
    revoking the first token, in response to generating the second token.

4. The method as claimed in claim 3, further comprising:
    revoking the second token, in response to finishing accessing the user information by the application.

5. The method as claimed in claim 1, further comprising:
    receiving a period of validity of the second token confirmed by the user; and
    allowing the application to access the user information a plurality of times during the period of validity of the second token.

6. The method as claimed in claim 1, further comprising:
    associating the second token with an application service address and a service method included in the first request.

7. The method as claimed in claim 6, wherein the step of allowing the application to access the user information includes:
    determining that the application service addresses and service methods included in the first request and the second request are the same; and
    allowing the application to access the user information in response to said determination.

8. The method as claimed in claim 1, wherein a user terminal of the user is a mobile telephone, and the user is authenticated by use of an International Mobile Subscriber Identity (IMSI) of the mobile telephone of the user.

9. A computer implemented apparatus for protecting user information, comprising:
    computer means; and
    instructions executable by the computer means to perform a method, the method including:
    receiving, from an application, a first request for accessing the user information;
    determining that the first request does not include an authorized token;
    responsive to the determination that the first request does not include an authorized token, generating and transmitting a first token to the application, and associating the first token with the first request;
    authenticating the user in response to receiving an authentication request from the user, said authentication request including the first token obtained from the application by the user;
    in response to authentication of the user, requesting the user to confirm the first request according to the association of the first token with the first request;
    in response to receipt of a user-initiated confirmation of the first request for generating a second token, transmitting the second token to the user, and associating the second token with the user;
    receiving a second request for accessing the user information from the application, said second request including the second token obtained from the user by the application, wherein the second token is also associated with a user identifier;
    allowing the application to access the user information according to the association of the second token with the user, in response to receiving said second request.

10. The apparatus as claimed in claim 9, wherein the associating the first token with the first request comprises associating the first token with an application service address and a service method included in the first request.

11. The apparatus as claimed in claim 10, wherein the method further comprises:
    revoking the first token in response to the generating of the second token.

12. The apparatus as claimed in claim 11, wherein the method further comprises:
    revoking the second token in response to finishing accessing the user information by the application.

13. The apparatus as claimed in claim 12, wherein the method further comprises:
    receiving a period of validity of the second token confirmed by the user; and allowing the application to access the user information a plurality of times during the period of validity of the second token.

14. The apparatus as claimed in claim 9, wherein the generating a second token, transmitting the second token to the user, and associating the second token with the user further comprises:

associating the second token with an application service address and a service method included in the first request.

15. The apparatus as claimed in claim 14, wherein the allowing the application to access the user information further comprises:

determining the application service addresses and service methods included in the first request and the second request are the same; and allowing the application to access the user information in response to said determination.

16. The apparatus as claimed in claim 9, wherein the method further comprises:

authenticating the user by use of an International Mobile Subscriber Identity (IMSI) of the mobile telephone of the user.

17. The apparatus as claimed in claim 9, wherein the apparatus comprises:

a user information storage module for storing the user information; and a service method function module for accessing the user information according to an instruction of the apparatus for protecting user information.

* * * * *